United States Patent Office 3,380,989
Patented Apr. 30, 1968

3,380,989
COPPER-CONTAINING DIS-, TRIS- AND TETRA-
KISAZO DYESTUFFS OF RESORCIN WITH β-
OXYETHYLSULFONE-SULFURIC ACID ESTER
GROUPS
Hermann Remy, West Warwick, R.I., assignor to Farbwerke Hoechst Aktiengesellschaft vormals Meister Lucius & Brüning, Frankfurt am Main, Germany, a corporation of Germany
No Drawing. Filed Oct. 16, 1964, Ser. No. 404,505
Claims priority, application Germany, Oct. 19, 1963,
F 41,041
5 Claims. (Cl. 260—145)

ABSTRACT OF THE DISCLOSURE

Complex copper compounds of water-soluble azo dyestuffs of the resorcin series having the formula:

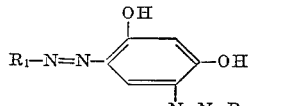

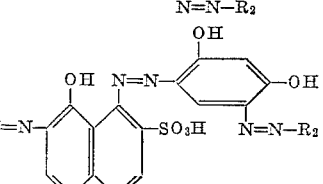

or

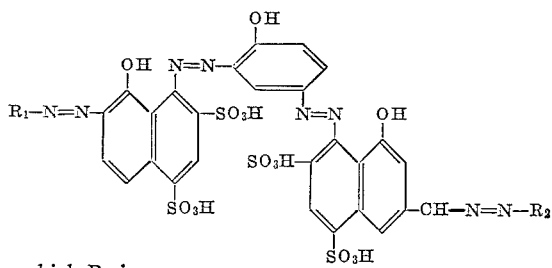

in which $R_1$ is

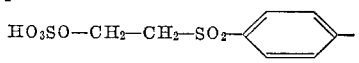

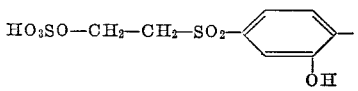

or

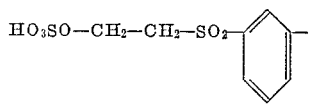

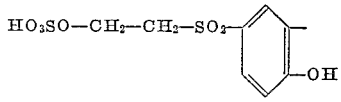

and $R_2$ is

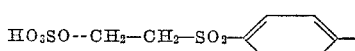

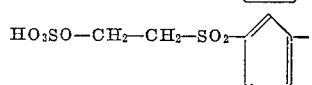

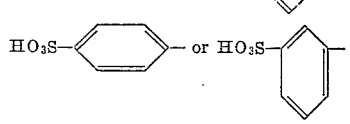

which compounds may be used for printing and dyeing cellulosic materials with good fastness properties especially with respect to light and to wet processing.

---

The present invention relates to a process for preparing water-soluble, copper-containing dis-, tris- and tetrakisazo dyestuffs of resorcin.

Now I have found that valuable, water-soluble, copper-containing dis-, tris- and tetrakisazo dyestuffs of resorcin can be prepared by subjecting dyestuffs of the formulae

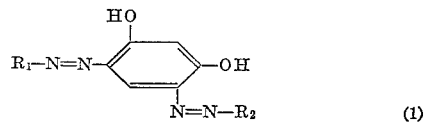

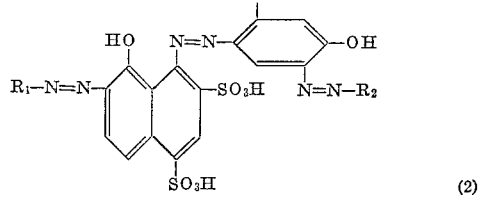

or

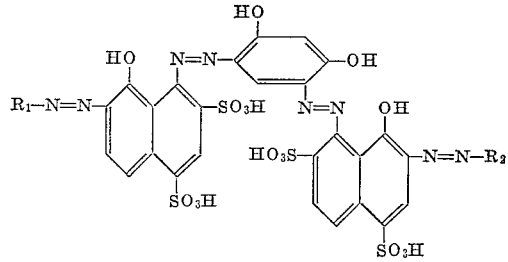

wherein $R_1$ represents the grouping

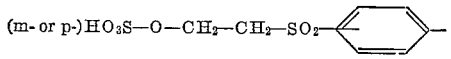

or

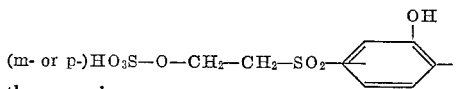

and $R_2$ the grouping

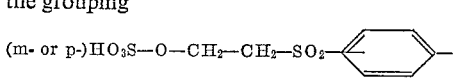

or

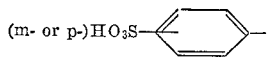

either direct to the oxidative coppering or first to a common coppering and then to an oxidative coppering.

The common (not the oxidative) coppering is advantageously carried out at temperatures within the range of from about 60° to 65° C., while the oxidative coppering is advantageously carried out within the range of from about 0° to 30° C., preferably about 0° to 8° C.

If, for example, hydrogen peroxide is used as oxidation agent in the oxidative coppering, it is advantageous to add this oxidation agent drop by drop within a period of at least 6 hours and within a pH range of about 5.0 to 5.2. After the oxidative coppering it is advantageous to continue stirring for about 24 hours prior to salting out the dyestuff.

As copper-yielding compound there may, for example, be used copper sulfate ($CuSO_4 \cdot 5H_2O$) or copper acetate (($CH_3$—$COO$)$_2Cu \cdot H_2O$; molecular weight 199.6).

As oxidation agent in the oxidative coppering hydrogen peroxide is especially suitable. The concentration of the hydrogen peroxide used may vary within wide limits. It

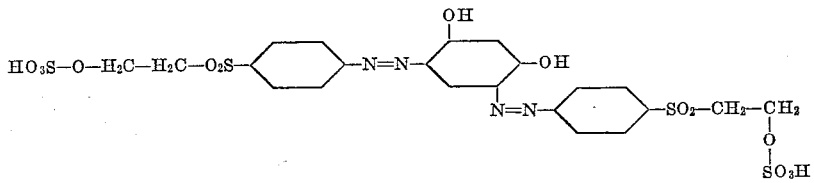

is advantageous to use a concentration within the range of from 10 to 50%, preferably about 20 to 35%. However, the concentration of the hydrogen peroxide may also be below 10%.

A sufficient dilution is of importance for carrying out the oxidative coppering. For example, per 1.7 parts by weight of a hydroxyl group to be introduced there should at least be applied 2,000 parts by volume of the reaction medium. In order to indicate an advantageous quantitative proportion of dyestuff: copper compound: oxidation agent (hydrogen peroxide), it is mentioned that per 1.7 parts by weight of a hydroxyl group to be introduced there should advantageously be applied about 30 parts by weight of $CuSO_4 \cdot 5H_2O$ and 15 parts by weight of hydrogen peroxide of 35% strength.

The copper complex dyestuffs obtained by the process of the present invention are the 1:1 complexes.

The dyestuffs obtained by the process of the present invention may be used not only for printing but also for dyeing cellulose materials. By the processes usually employed in the manufacture of reactive dyestuffs, brown dyeings or prints are obtained on natural or regenerated cellulose materials in the presence of agents having an alkaline action, which dyeings or prints are distinguished by good fastness properties, especially by a good fastness to wet processing and a good fastness to light.

In contrast to the corresponding dyestuffs which have not been submitted to a coppering or which have only partially been submitted to a coppering, i.e., without the aid of an oxidation agent, the dyestuffs obtained by the process of the present invention are distinguished by a more pronounced depth of color and improved fastness properties, for example by a reduced sensitivity to alkaline compounds and by an improved fastness to scouring and to light.

The following examples serve to illustrate the invention, but they are not intended to limit it thereto:

EXAMPLE 1

57 parts by weight of 1-amino-benzene-4β-oxethyl-sulfone-sulfuric acid ester, 35 parts by weight of hydrochloric acid of 31.8% strength and 80 parts by weight of ice were introduced into 250 parts by volume of water. The mixture was stirred for half an hour and then 42 parts by weight of an aqueous sodium nitrite solution of 34.8% strength was added at 0°–5° C. During the course of another 90 minutes the diazonium salt suspension showed an alkaline reaction to Congo paper while being stirred, and showed against 4,4′-diamino-diphenyl-methane-2,2′-sulfone an excess amount of sodium nitrite. This excess amount of nitrite was removed by the addition of amido sulfonic acid.

After the addition of 11 parts by weight of resorcin in the form of an aqueous solution (dissolved in about 350 parts by weight of water), the pH value was increased to 6.0–6.5 by the addition of sodium carbonate. The mixture was then stirred for 15 hours. After the volume of the reaction mixture had been increased to 14,000 parts by volume by the addition of water, 60 parts by weight of copper sulfate and 60 parts by weight of sodium acetate were added. After 30 minutes, 30 parts by weight of hydrogen peroxide of 35% strength were added dropwise during the course of 2 hours at 20°–25° C. and at a pH value of 5.0 to 5.2.

After the mixture had been stirred for 12 hours, the copper complex of the azo dyestuff corresponding to the formula

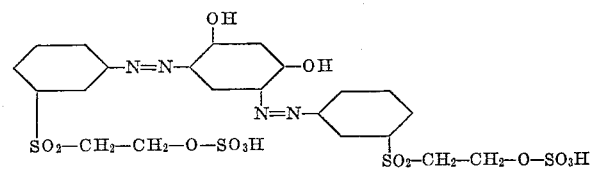

was salted out by means of potassium chloride, filtered off, washed with a potassium chloride solution of 10% strength by weight and with ice water, and dried at 65° C.

It dyed cotton in the presence of agents having an alkaline action brown tints of good fastness to wet processing and a good fastness to light.

EXAMPLE 2

If instead of 57 parts by weight of 1-aminobenzene-4β-oxethylsulfone-sulfuric acid ester 57 parts by weight of 1 - aminobenzene - 3β-oxethylsulfone-sulfuric acid ester were used and the reaction was otherwise carried out as described in Example 1, there was obtained the copper complex of the azo dyestuff corresponding to the formula having similar properties as the dyestuff obtained according to Example 1 but a distinctly deeper tint of brown.

EXAMPLE 3

17.3 parts by weight of sulfanil acid were diazotized in the usual manner. After the excess amount of nitrite had been removed, 11 parts by weight of resorcin were added in the form of an aqueous solution. The pH value was increased to 5.0 to 5.5 by the addition of sodium carbonate and sodium bicarbonate and maintained at 8° to 10° C. for 5 hours. Then the diazonium salt of 28.5 parts by weight of 1-amino-benzene-4β-oxethylsulfone-sulfuric acid ester (prepared as described in Example 1) was added after the excess amount of nitrite had been removed, and the pH value at 10° C. was increased to 6.0 to 6.5 by the addition of sodium carbonate. After 15 hours the reaction mixture was diluted to 4,000 parts by volume, 60 parts by weight of copper sulfate and 60 parts by weight of sodium acetate were added thereto, and after another 30 minutes 30 parts by weight of hydrogen peroxide of 35% strength were introduced during the course of 2 hours at 20°–25° C. at a pH value of 5.0 to 5.2. After another 12 hours the copper complex of the azo dyestuff corresponding to the formula

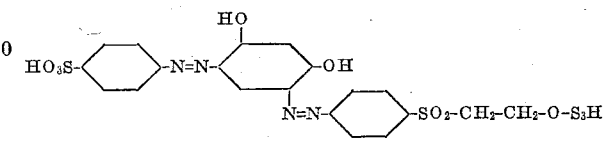

was salted out by means of potassium chloride, filtered off, washed with a potassium chloride solution of 10% strength by weight and with ice water, and dried at 65° C. It dyes cotton in the presence of agents having an alkaline action brown tints of good fastness to wet processing and a good fastness to light.

EXAMPLE 4

If 28.5 parts by weight of 1-aminobenzene-3β-oxethyl-sulfone-sulfuric acid ester were used in Example 3 instead of 28.5 parts by weight of 1-aminobenzene-4β-oxethylsulfone-sulfuric acid ester and the reaction was otherwise carried out as described in Example 3, there was obtained a copper complex of the azo dyestuff corresponding to the formula

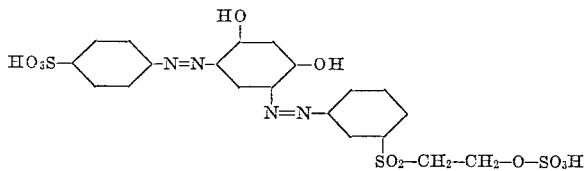

which was dyed a somewhat deeper brown tint and possessed similar properties as the dyestuff described in Example 3.

EXAMPLE 5

21.7 parts by weight of 2-aminophenol-4β-oxethylsulfone were introduced into 35 parts by volume of concentrated sulfuric acid at 25°–35° C. The reaction mixture obtained was stirred overnight at this temperature. The following morning the mixture was decomposed by allowing the mixture to drop onto 360 parts of ice. After the pH value of the solution had been neutralized to 0.8 to 1.0 with a sodium hydroxide solution, the solution was diazotized at 4°–8° C. with 13 to 14 parts by volume of an aqueous sodium nitrite solution of 40% strength by weight. After the solution had been stirred for 80 minutes, the excess amount of nitrite was removed with amidosulfonic acid. After the addition of 11 parts by weight of resorcin in the form of an aqueous solution, the pH value was gradually increased to 6.0–6.5 by the addition of sodium carbonate. The mixture was stirred for 15 hours at 10° C. The diazonium salt of 17.6 parts by weight of sulfanil acid was added and the pH value was again adjusted to 6.0 to 6.5. After 5 hours the mixture was heated to 60°–65° C. and, after the addition of 60 parts by weight of copper sulfate and 60 parts by weight of sodium acetate at a pH value of 5.0 to 5.2, this temperature was maintained for two hours. The reaction mixture was diluted to 3,000 parts by volume by the addition of water, and 15 parts by weight of hydrogen peroxide of 35% strength were added thereto during the course of one hour at 20°–25° C. at a pH value of 5.0 to 5.2. After another 15 hours the copper complex of the azo dyestuff corresponding to the formula

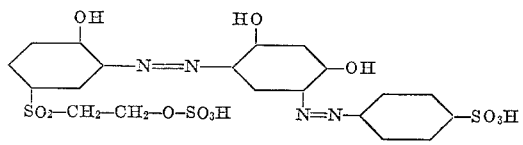

was isolated as described in Example 3. It is identical with the dyestuff obtained according to Example 4.

EXAMPLE 6

If instead of 17.3 parts by weight of sulfanil acid and 28.5 parts by weight of 1 aminobenzene-4β-oxethylsulfone-sulfuric acid ester 17.3 parts by weight of metanil acid and 28.5 parts by weight of 1-aminobenzene-3β-oxethylsulfone-sulfuric acid ester were used and the reaction was otherwise carried out as described in Example 3, the copper complex of the azo dyestuff corresponding to the formula

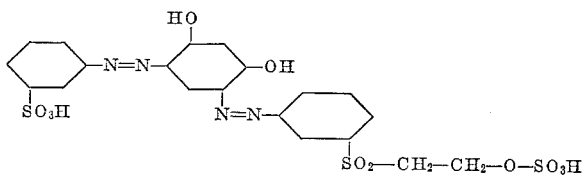

was obtained which dyed cotton in the presence of agents having an alkaline action brown tints of good fastness to wet processing and a good fastness to light.

EXAMPLE 7

If in Example 5, instead of the sulfuric acid ester of 21.7 parts by weight of 2-aminophenol-4β-oxethylsulfone, 18.9 parts by weight of diazotized 2-aminophenol-4-sulfonic acid were coupled with 11 parts by weight of resorcin, and the azo compound so obtained was coupled, instead of with 17.6 parts by weight of diazotized sulfanil acid, with 28.5 parts by weight of diazotized 1-aminobenzene-3β-oxethylsulfone-sulfuric acid ester and the reaction was carried out otherwise as described in Example 5, there was obtained the copper complex of the azo dyestuff corresponding to the formula

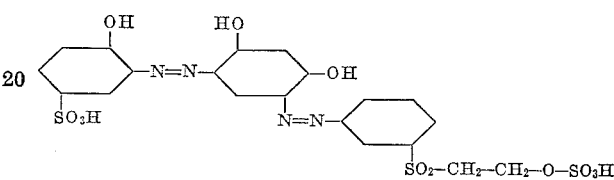

EXAMPLE 8

If instead of 17.6 parts by weight of diazotized sulfanil acid 17.6 parts by weight of diazotized metanil acid were used and the reaction was otherwise carried out as described in Example 5, the copper complex of the azo dyestuff corresponding to the formula

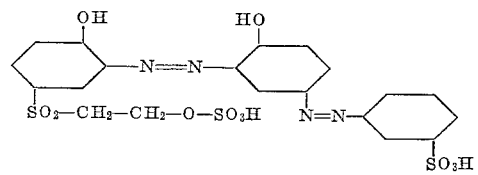

was obtained.

EXAMPLE 9

28.1 parts by weight of diazotized 1-aminobenzene-4β-oxethylsulfone-sulfuric acid ester were added to the aqueous solution of 31.9 parts by weight of 1-amino-8-oxynaphthalene-2,4-disulfonic acid, the pH value of which had been adjusted to 6.9 by the addition of 8 parts by weight of sodium acetate. The pH value of the mixture was then adjusted to 6.2 to 6.5. The mixture was stirred for 3 hours at 10° C.

The red dyestuff so obtained was diazotized at 4°–6° C. by reducing the pH value to 0.8 to 1.0 by means of hydrochloric acid and by adding the aqueous solution of 7.0 parts by weight of sodium nitrite. The solution was stirred for two hours and the excess amount of nitrite removed with amido-sulfonic acid. 11 parts by weight of resorcin were added and the pH value was increased to 5.0 to 5.5 by the addition of sodium carbonate and sodium bicarbonate and maintained at this value for 30 minutes at 10° C. Then the pH value was increased to 6.2 to 6.5 by the addition of sodium carbonate and maintained at this value for 15 hours at 10° C.

Then 28.5 parts by weight of diazotized 1-aminobenzene-4β-oxethylsulfone-sulfuric acid ester were added to the reaction mixture and the pH vlue was increased to 6.5–6.8 by means of sodium carbonate and maintained at this value for 12 hours at 10° C. The mixture was diluted to 4,500 parts by volume by the addition of water, and 60 parts by weight of sodium acetate were added thereto. The mixture was left for 30 minutes and then 30 parts by weight of hydrogen peroxide of 35% strength were added at 20°–25° C. during the course of 3 hours at a pH value of 5.0–5.2.

After another 12 hours the copper complex of the azo dyestuff corresponding to the formula

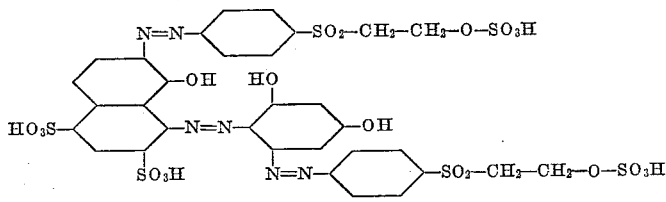

was salted out by means of potassium chloride, filtered off, washed with a potassium chloride solution of 10% strength by weight and with ice water, and dried at 65° C.

It dyes cotton in the presence of agents having an alkaline action brown tints of good fastness to wet processing and a good fastness to light.

EXAMPLE 10

If instead of 28.1 parts by weight of 1-amino-benzene-4β-oxyethylsulfone-sulfuric acid ester there were used 28.1 parts by weight of 1-aminobenzene-3β-oxyethylsulfone-sulfuric acid ester, and instead of 28.5 parts by weight of 1-aminobenzene-4β-oxyethylsulfone-surfuric acid ester 28.5 parts by weight of 1-amino-benzene-3β-oxyethylsulfone-sulfuric acid ester and the reaction waso therwise carried out as described in Example 9, there was obtained the copper complex of the azo dyestuff corresponding to the formula

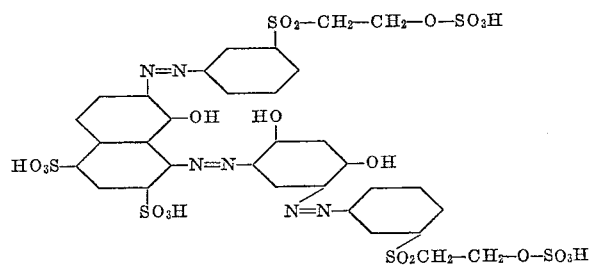

which possessed properties similar to those of the dyestuff obtained according to Example 9.

EXAMPLE 11

If instead of 28.5 parts by weight of 1-aminobenzene-4β-oxyethylsulfone-sulfuric acid ester there were used 28.5 parts by weight of 1-aminobenzene-3β-oxyethylsulfone-sulfuric acid ester and the reaction was otherwise carried out as described in Example 9, there was obtained the copper complex of the azo dyestuff corresponding to the formula

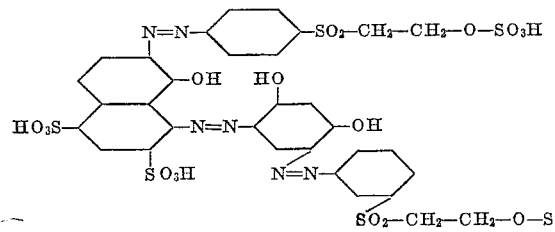

which possessed properties similar to those of the dyestuff obtained according to Example 9.

EXAMPLE 12

If instead of 28.1 parts by weight of 1-aminobenzene-4β-oxyethylsulfone-sulfuric acid ester there were used 28.1 parts by weight of 1-amino-benzene-3β-oxyethylsulfone-sulfuric acid ester and the reaction was otherwise carried out as described in Example 9, there was obtained the copper complex of the azo dyestuff corresponding to the formula

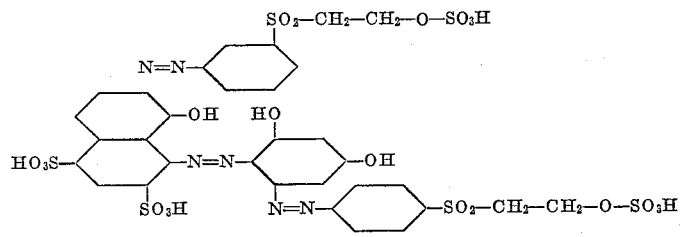

which possessed properties similar to those of the dyestuff obtained according to Example 9.

EXAMPLE 13

5.2 parts by weight of diazotized 1-aminobenzene-4β-oxyethylsulfone-sulfuric acid ester were coupled, as described in Example 9, with 63.8 parts by weight of 1-amino-8-oxynaphthalene-2,4-disulfonic acid. The red dyestuff primarily obtained in this manner was then coupled with 11 parts by weight of resorcin at a pH value of 6.5 to 6.8. After the reaction mixture had been stirred for 12 hours at 10° C., the reaction mixture was diluted to 6,000 parts by volume by the addition of water, and 120 parts by weight of copper sulfate and 120 parts by weight of sodium acetate were added thereto. The mixture was left for 30 minutes, and then 60 parts by weight of hydrogen peroxide of 35% were added thereto during the course of 4 hours at 20°–25° C. at a pH value of 5.0–5.2.

After another 12 hours the copper complex of the azo dyestuff corresponding to the formula

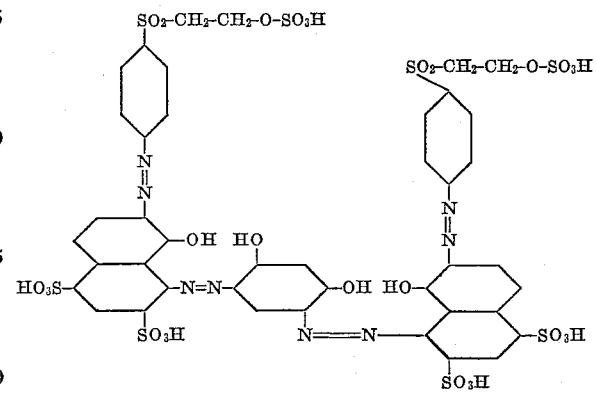

was isolated as described in Example 9.

If instead of 56.2 parts by weight of 1-aminobenzene-kaline action brown tints of a violet hue of good fastness to wet processing and a good fastness to light.

EXAMPLE 14

If instead of 56.2 parts by weight of 1-aminobenzene-4β-oxyethylsulfone-sulfuric acid ester there were used 56.2 parts by weight of 1-aminobenzene-3β-oxyethylsulfone-sulfuric acid ester and the reaction was otherwise carried out as described in Example 13, there was obtained a brown copper complex of the azo dyestuff corresponding to the formula

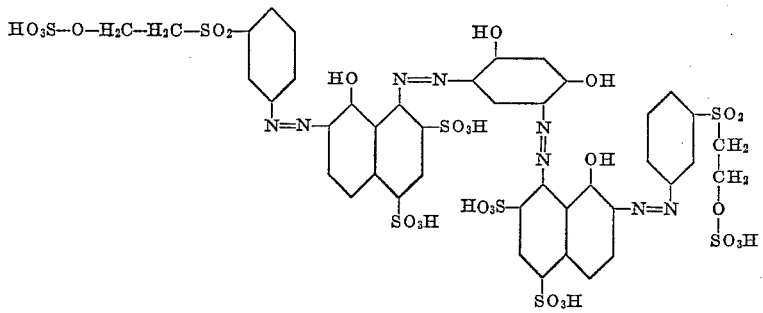

possessing properties similar to those of the dyestuff obtained according to Example 13.

EXAMPLE 15

First the diazotized coupling product of 28.1 parts by weight of diazotized 1-aminobenzene-4β-oxyethylsulfone-sulfuric acid ester and 31.9 parts by weight of 1-amino-8-oxynaphthalene-2,4-disulfonic acid was coupled with 11 parts by weight of resorcin according to Example 9. After 15 hours the azo compound thus obtained, which was still capable of coupling, was coupled with the diazotized coupling product of 28.1 parts by weight of diazotized 1-amino-benzene-3β-oxyethylsulfone-sulfuric acid ester and 31.9 parts by weight of 1-amino-8-oxynaphthalene-2,4-disulfonic acid at a pH value of 6.5–6.8.

After the mixture had been stirred for 12 hours, it was subjected to an oxidative coppering as described in Example 13, and isolated.

There was obtained a brown copper complex of the azo dyestuff corresponding to the formula

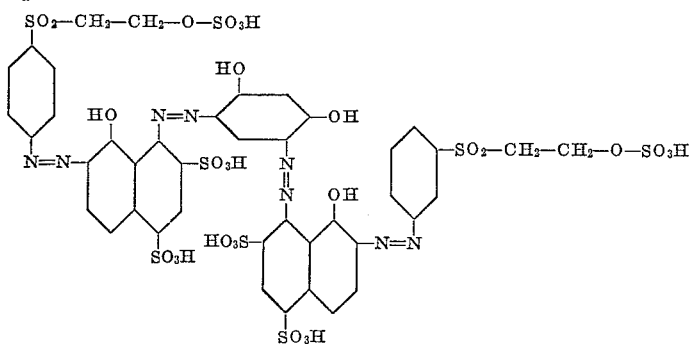

having properties similar to those of the dyestuff obtained according to Example 13.

I claim:
1. The dyestuff of the formula

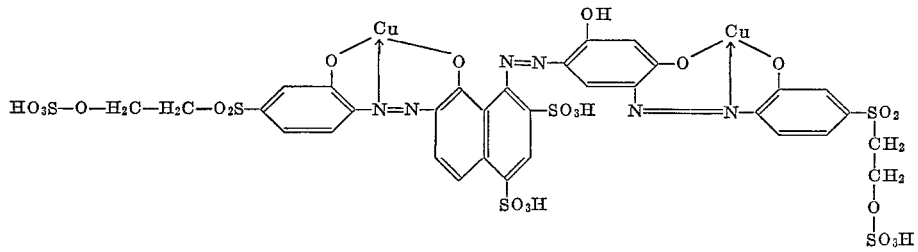

2. The dyestuff of the formula

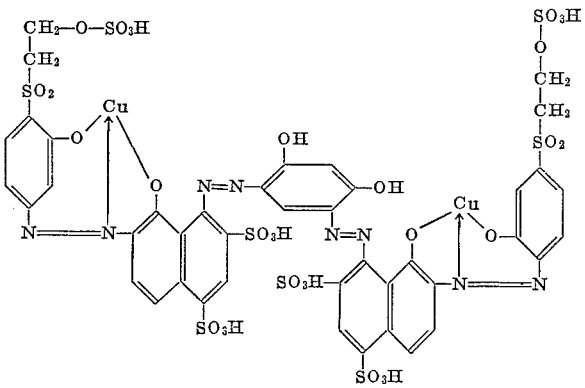

3. The dyestuff of the formula
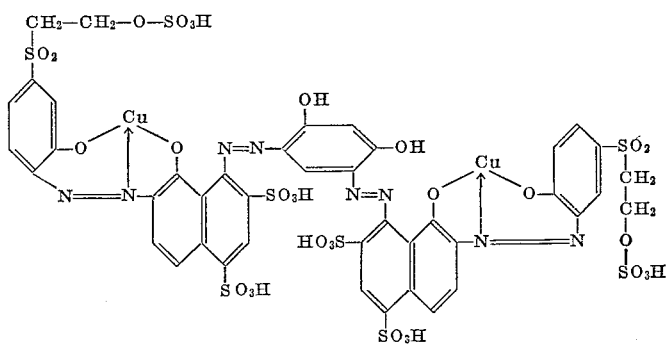
4. The dyestuff of the formula
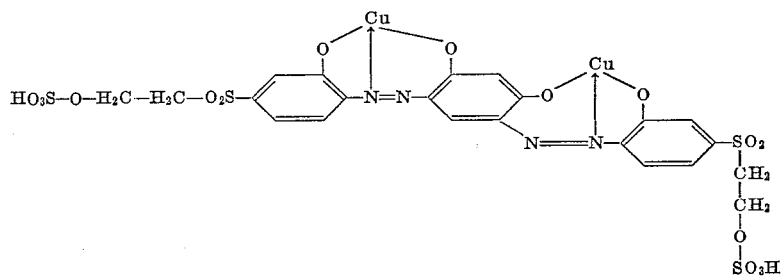
5. The dyestuff of the formula
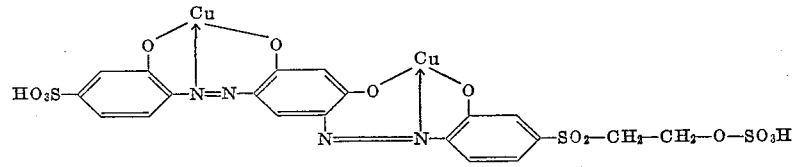
References Cited
UNITED STATES PATENTS
3,135,730   6/1964   Heyna et al. _____ 260—147
3,135,779   6/1964   Hoyer et al. ____ 260—145 XR
FLOYD D. HIGEL, *Primary Examiner.*